United States Patent
Makkar et al.

(10) Patent No.: US 9,415,658 B1
(45) Date of Patent: Aug. 16, 2016

(54) INDEPENDENT VEHICLE RIDE HEIGHT ADJUSTMENT

(71) Applicant: Continental Automotive Systems, Inc., Auburn Hills, MI (US)

(72) Inventors: Sunny Makkar, Troy, MI (US); Christian Schallmeier, Lake Orion, MI (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 0 days.

(21) Appl. No.: 14/862,316

(22) Filed: Sep. 23, 2015

(51) Int. Cl.
| | |
|---|---|
| *B60G 17/00* | (2006.01) |
| *B60G 17/0165* | (2006.01) |
| *B60G 17/015* | (2006.01) |
| *B60R 21/0134* | (2006.01) |
| *B60R 21/34* | (2011.01) |
| *B60R 21/01* | (2006.01) |

(52) U.S. Cl.
CPC ........ *B60G 17/0165* (2013.01); *B60G 17/0155* (2013.01); *B60R 21/0134* (2013.01); *B60R 21/34* (2013.01); *B60G 2400/80* (2013.01); *B60G 2800/912* (2013.01); *B60R 2021/01013* (2013.01)

(58) Field of Classification Search
None
See application file for complete search history.

(56) References Cited

U.S. PATENT DOCUMENTS

| | | | |
|---|---|---|---|
| 6,728,617 B2 * | 4/2004 | Rao ................ | B60R 21/013 342/42 |
| 6,993,422 B2 * | 1/2006 | De Mersseman .. | B60G 17/0164 280/5.504 |

(Continued)

*Primary Examiner* — Jonathan M Dager

(57) ABSTRACT

A method of orientating a vehicle for a potential impact includes detecting an object proximate a vehicle with at least one sensor mounted to the vehicle, identifying if the object is a pedestrian, determining a potential for a collision between the object and the vehicle with a controller mounted within the vehicle and determining a vehicle orientation for mitigating damage based on the determined potential for collision. The determined vehicle orientation includes at least an independent determination of a ride height for each corner of the vehicle. The method further includes actuating a suspension component to move each corner of the vehicle to the determined ride height for that corner independent of the other corners of the vehicle to place the vehicle in an orientation determined to mitigate damage and injury. A controller provides the independent determination of a ride height for each corner of the vehicle. The controller further is configured to initiate actuation of at least one suspension component of the vehicle to place the vehicle in the determined vehicle orientation that mitigates injury.

18 Claims, 4 Drawing Sheets

(56) References Cited

U.S. PATENT DOCUMENTS

| | | | |
|---|---|---|---|
| 8,996,236 B2* | 3/2015 | Mack | B60R 21/013 180/274 |
| 9,102,290 B1* | 8/2015 | Cuddihy | B60R 19/023 |
| 2005/0080530 A1* | 4/2005 | Arduc | B60G 15/063 701/37 |
| 2005/0200462 A1* | 9/2005 | Maekawa | B60Q 5/008 340/435 |
| 2006/0131799 A1* | 6/2006 | Carlitz | B60G 11/14 267/195 |
| 2007/0168128 A1* | 7/2007 | Tokoro | B60R 21/013 701/301 |
| 2007/0267892 A1* | 11/2007 | Scheuch | B60R 21/38 296/187.04 |
| 2008/0136140 A1* | 6/2008 | Karlsson | B60R 21/38 280/727 |
| 2008/0319670 A1* | 12/2008 | Yopp | B60W 30/16 701/301 |
| 2009/0160109 A1* | 6/2009 | Matsubara | B60R 21/34 267/2 |
| 2010/0106387 A1* | 4/2010 | Tsuchida | B60R 21/0134 701/70 |
| 2011/0011256 A1* | 1/2011 | Borg | B60R 21/38 91/356 |
| 2011/0246156 A1* | 10/2011 | Zecha | G60K 9/00 703/6 |
| 2011/0297471 A1* | 12/2011 | Koestler | B60R 21/38 180/274 |
| 2012/0041642 A1* | 2/2012 | Engelhardt | B60G 17/0523 701/37 |
| 2014/0172234 A1* | 6/2014 | Headley | B60R 21/34 701/41 |
| 2016/0016561 A1* | 1/2016 | Lee | B60T 7/22 701/70 |
| 2016/0114800 A1* | 4/2016 | Shimizu | B60W 30/0956 701/70 |

* cited by examiner

INDEPENDENT VEHICLE RIDE HEIGHT ADJUSTMENT

TECHNICAL FIELD

The present disclosure relates to a vehicle ride height adjustment system for changing a vehicle orientation to mitigate potential occupant and pedestrian injury.

BACKGROUND

Vehicle suspension systems provide height adjustment during vehicle operation to improve vehicle stability and control. Vehicles are increasingly being equipped with detection technology that senses the location of objects around the vehicle. The detection technology is sometimes utilized to provide a pre-crash alert such that safety systems can be actuated. Safety system such air bags or seat belt tightening devices can be actuated in response to a potential collision to mitigate potential injury. Such systems have further been utilized to lower the height of the vehicle responsive to recognition of a potential collision. Lowering of the vehicle ride height is utilized to align the bumper of one vehicle with the bumper of another vehicle to reduce vehicle damage and injury. Each potential collision event is unique and therefore may require a unique vehicle orientation to minimize damage. However, current systems provide only a predefined vehicle response, such as lowering of the vehicle, and therefore not all potential collision possibilities are accommodated including those involving pedestrians.

SUMMARY

An example embodiment of a method of orientating a vehicle for a potential impact includes detecting an object proximate a vehicle with at least one sensor mounted to the vehicle, identifying if the object is a pedestrian, determining a potential for a collision between the object and the vehicle with a controller mounted within the vehicle and determining a vehicle orientation for mitigating damage based on the determined potential for collision. The determined vehicle orientation includes at least an independent determination of a ride height for each corner of the vehicle. The method further includes actuating a suspension component to move each corner of the vehicle to the determined ride height for that corner independent of the other corners of the vehicle to place the vehicle in an orientation determined to mitigate damage and injury.

An example embodiment of a vehicle crash preparation system includes a controller configured to receive information indicative of an object proximate that vehicle, identify if the objects proximate the vehicle is a pedestrian, and determine a vehicle orientation that minimizes damage responsive to a determination that a collision with the object is likely. The controller provides the determined vehicle orientation to include an independent determination of a ride height for each corner of the vehicle. The controller further is configured to initiate actuation of at least one suspension component of the vehicle to place the vehicle in the determined vehicle orientation.

Although the different examples have the specific components shown in the illustrations, embodiments of this disclosure are not limited to those particular combinations. It is possible to use some of the components or features from one of the examples in combination with features or components from another one of the examples.

These and other features disclosed herein could be best understood from the following specification and drawings, the following of which is a brief description.

DETAILED DESCRIPTION

Figure 1:
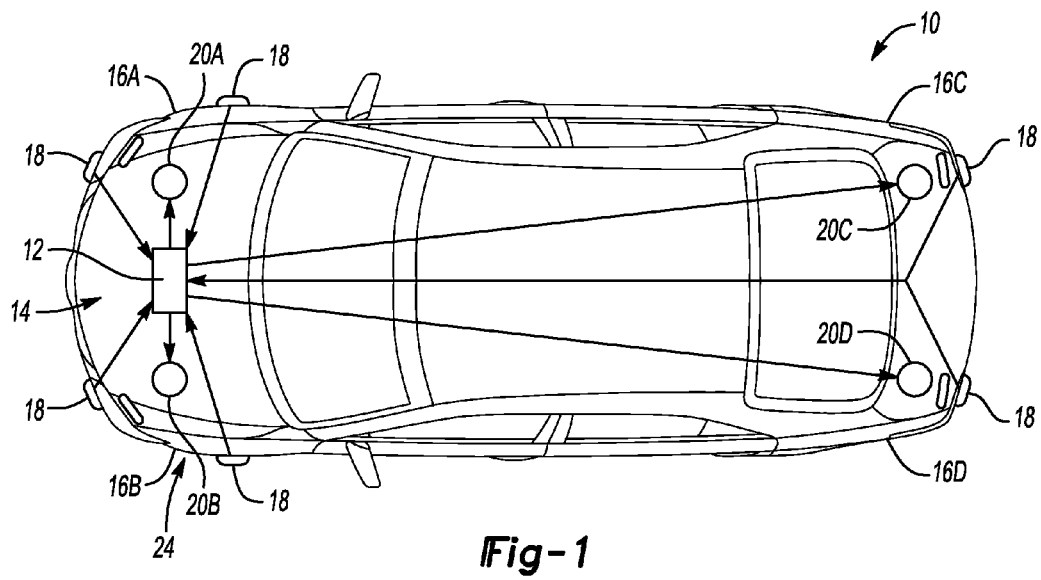
FIG. 1 is a schematic view of an example vehicle including a crash preparation system.

Referring to FIG. 1, an example vehicle 10 includes a crash preparation system 14. The crash preparation system 14 provides for orientation of the vehicle in response to the determination of an imminent collision to place the vehicle in an orientation determined to minimize damage to both the vehicle, occupants within the vehicle and an object with which it is potentially colliding.

The example system 14 includes a controller 12 mounted within the vehicle 10. The example controller 12 may be a dedicated controller 12 for the example system 14 or part of a vehicle controller or software program for a vehicle suspension or other control system. The example vehicle 10 includes a plurality of sensors 18 that are capable of recognizing an object and providing information to the controller 12 indicative of the objects proximate to the vehicle. The sensors 18 may be any configuration of a sensor known to a worker skilled in the art that can provide information indicative of objects around the vehicle and also provide information that can be utilized by the controller 12 to predict a path of those objects relative to the vehicle.

The example system 14 operates with and/or as part of a suspension system 24 that includes a plurality of suspension components 20. In this example, the suspension system 24 includes suspension components 20a-d at each of the corners 16a-d. The example suspension components 20a-d are capable of raising and lowering each corner of the vehicle 10 individually and independent of the other corners of the vehicle 10. In one example, each of the suspension components 20a-d comprises a pneumatic spring that is capable of being inflated to raise the vehicle or deflated to lower the vehicle.

Figure 2:
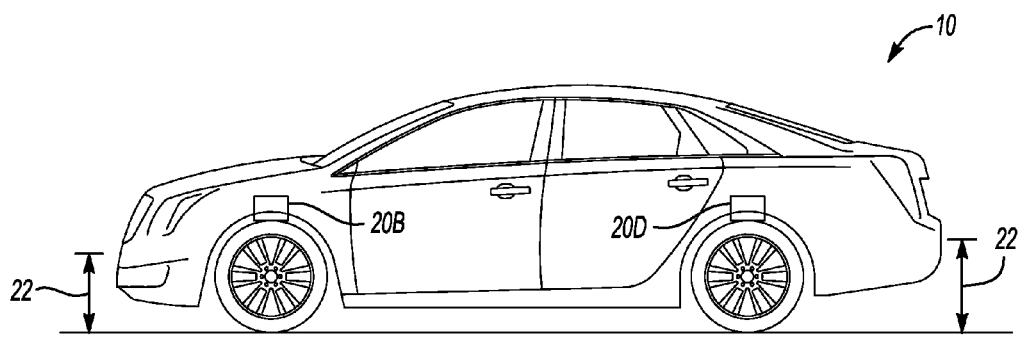
FIG. 2 is a side view of the example vehicle in a normal operating position.

Referring to FIG. 2, with continued reference to FIG. 1, the example vehicle 10 is illustrated in a standard orientation such that a ride height 22 for both the front of the vehicle and the rear of the vehicle is at a conventional height utilized for typical driving conditions.

Figure 3:
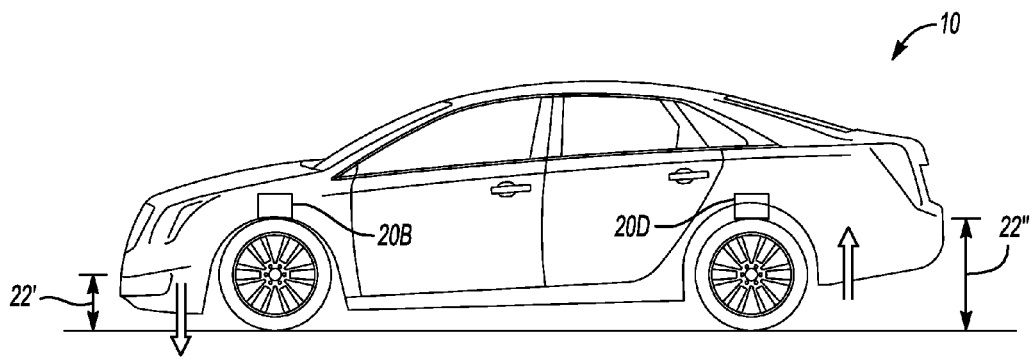
FIG. 3 is a side view of the vehicle in a position with a front portion lowered.

Referring to FIG. 3, the example vehicle 10 is illustrated with a modified ride height were the front portion of the vehicle is lowered to a ride height 22'. The lower ride height 22' is utilized to place the vehicle in an orientation determined to provide minimal damage upon contact with a detected object. In this example, the rear portion is elevated to a ride height 22" such that vehicle orientation provides for a greater downward angle or lower ridge height in the front portion. It should be appreciated that it is within the contemplation of this disclosure that each of the corners 16a-d can be raised or lowered independent of other corners to place the vehicle in an orientation that is tailored to the detected potential collision.

Figure 4:
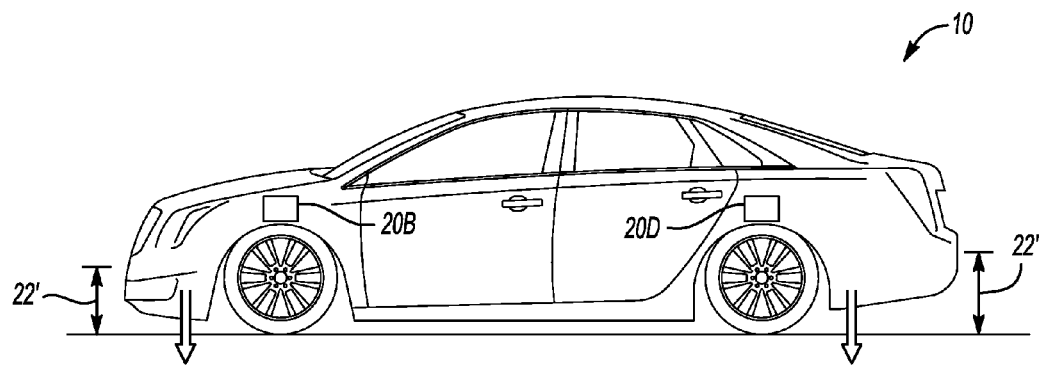
FIG. 4 is a side view of a vehicle with both front and rear portions of the vehicle lowered.

Referring to FIG. 4, in another vehicle orientation both the front and rear of the vehicle are lowered to a common ride height 22'. In this orientation, each of the suspension components 20a-d are lowered to place the vehicle in its lowest possible orientation to minimize potential damage to both the vehicle 10 and the object that it may be colliding with.

Figure 5:
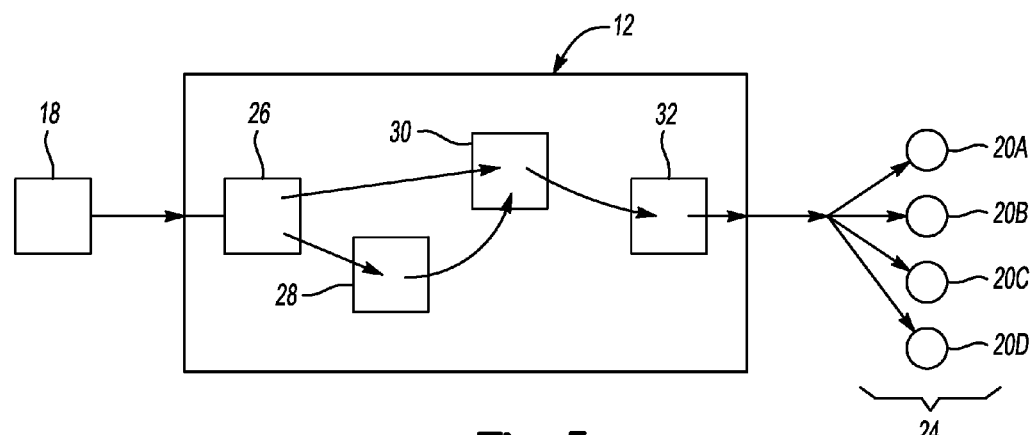
FIG. 5 is a schematic representation of a controller for the example system.

Referring to FIG. 5, with reference to FIG. 1, the example controller 12 includes several portions that are utilized in analyzing and determining information provided by sensors 18. In this disclosed example, the controller 12 includes a first portion 26 configured to receive information from the sensors 18. The information received from the sensors 18 is utilized to identify the object and also to determine a potential future trajectory of that object.

The controller includes a second portion 28 that receives information from the first portion 26 indicative of the object detected proximate the vehicle. The second portion 28 provides for the identification of the object. Identification of the object can be made in several ways including the detected size, speed and trajectory of the object relative the vehicle. Moreover, any other means of identifying the objects that are known in the art can also be utilized and are within the contemplation of this disclosure. The second portion 28 provides for the detection and identification of a pedestrian relative to the vehicle. The detection and identification of the pedestrian proximate to the vehicle is utilized for determining what orientation of the vehicle that minimize damage to the vehicle and occupants within the vehicle and also mitigate damage to the pedestrian. Accordingly, the second portion 28 uses the sensor information received by the controller 12 to identify a pedestrian.

The controller 12 further includes a third portion 30. The third portion 30 utilizes information from the sensors 18 and from the second portion 28 to determine the optimal vehicle orientation in preparation for a collision with the object. As appreciated, the optimal vehicle orientation will depend on the nature of the object. If the vehicle 10 is approaching a pedestrian, the vehicle orientation will be adapted to minimize injury to the pedestrian. If, however, the vehicle is approaching another vehicle then the vehicle orientation will be modified and set in a different orientation.

Not only is the vehicle orientation determined, but the controller 12 in the third portion 30 is also configured to predict a post-crash trajectory of a pedestrian should a collision occur. As appreciated, much injury and damage can occur in the post-crash trajectory of a pedestrian relative the vehicle and thereby the example controller 30 utilizes information obtained on the pedestrian including speed, size and location relative to the vehicle to predict a post collision trajectory. The controller 12 then determines if a more favorable trajectory could be enacted but orientating the vehicle in a certain condition. If a more favorable trajectory for post collision of the pedestrian can be affected then the controller 12 will orientate the vehicle to not only mitigate damage during the collision but also provide the most optimal post collision trajectory for the pedestrian that reduces injury. The post collision trajectory may also include landing the pedestrian on specific parts of the vehicle to mitigate potential injury.

The controller 12 includes a fourth portion 32 that utilizes the information obtained regarding the predicted path and predicted post collision trajectory to provide signals to the various vehicle systems utilized to prepare the vehicle and place it in a desired orientation for the potential collision. In this example, the fourth portion 32 provides instructions to the suspension system 24 to actuate each of the suspension components arranged within the vehicle to orientate the vehicle as desired. In the disclosed example, the suspension components 20a-d include pneumatic springs that allow for the vehicle to be raised and lowered at each corner 16a-d. The disclosed example provides for actuation at each of the corners of the vehicle individually for orientating each corner of the vehicle depending on the most favorable orientation of the vehicle in view of detected pending collision.

Figure 6A:
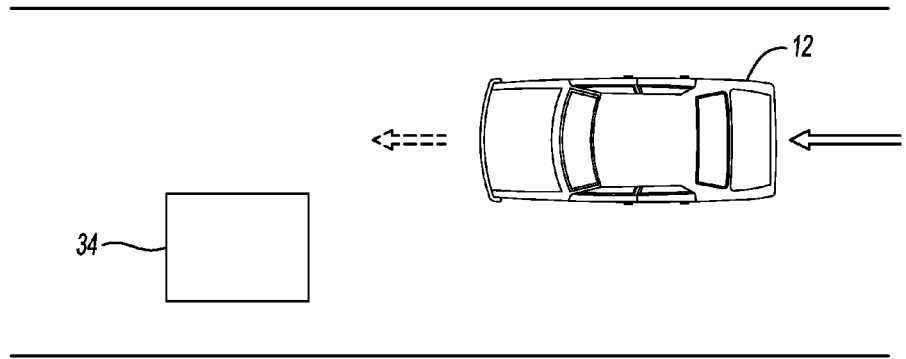
FIG. 6A is a schematic view of an initial condition of a vehicle approaching a fixed object.
Figure 6B:
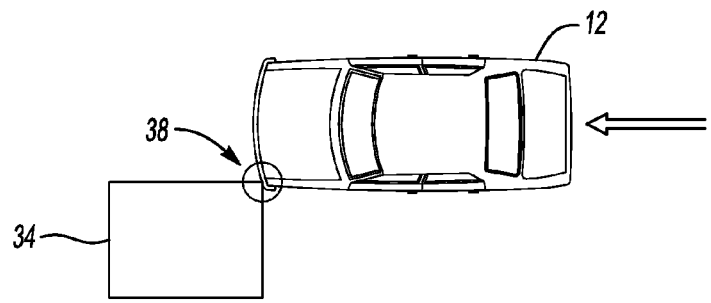
FIG. 6B is a schematic representation of a vehicle colliding with the fixed objection.

Referring to FIGS. 6A and 6B, the example system operates by first detecting an oncoming object and determining the characteristics of that object. In this example, the vehicle 10 is approaching a fixed object 34. The controller 12 will receive information from the sensors 18 indicative of the object 34. In this instance, the sensors 18 will relay information to the controller 12 that is utilized to determine that the object 34 is fixed and the vehicle is approaching it. Once the characteristics of the object 34 and the trajectory of the vehicle relative of the object 34 are determined, a specific vehicle orientation will be selected and will be implemented by the controller 12. In this example, because the vehicle is approaching a fixed object, the vehicle will reduce the ride height 22' as shown in FIG. 3 to lower the front end such that the impact surface intended to absorb collision forces will impact the fixed object 34 first at the point of contact 38. As appreciated, depending on the speed of the vehicle, other orientations of the vehicle may be more suitable. For instance, it may be suitable for the example system not to adjust the ride height but also leave the vehicle at the standard ride height configuration depending on the characteristics of the object.

Figure 7A:
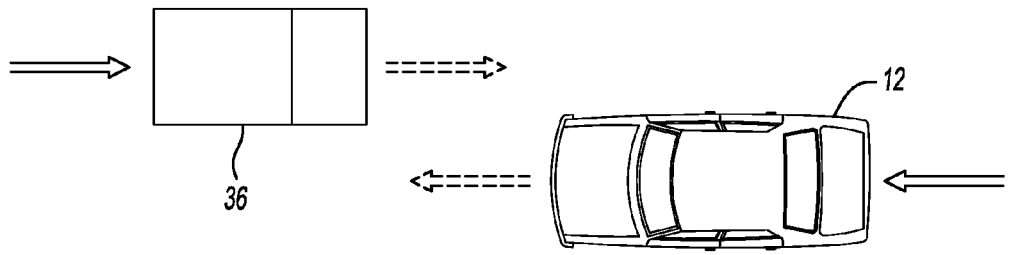
FIG. 7A is a schematic representation of two vehicles approaching each other.
Figure 7B:
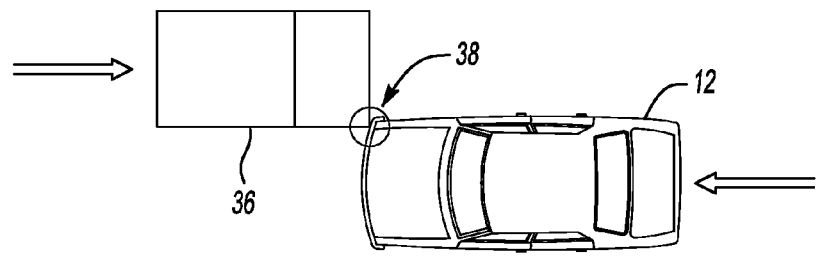
FIG. 7B is a schematic representation of two vehicles at colliding with each other.

Referring to FIGS. 7A and 7B, another potential collision scenario is illustrated where the vehicle 10 is approaching another vehicle 36. In this example, the vehicle 10 is provided with information indicative of the proximity and trajectory of the other vehicle 36. Moreover, characteristics of the other vehicle can be determined. For example, it can be determined if the other vehicle 36 a larger vehicle such as a truck. Accordingly, if the approaching vehicle is a truck or a larger vehicle it may not make sense to lower the front end but it may make sense to raise the front end such that the impact is absorbed by the bumper and energy absorbing structures of the vehicle 12 at the point of impact 38. As appreciated, the controller 12 orientates the vehicle and tailors the vehicle orientation to the oncoming danger in order to mitigate damage to the vehicle and occupants seated within the vehicle cabin.

Figure 8A:
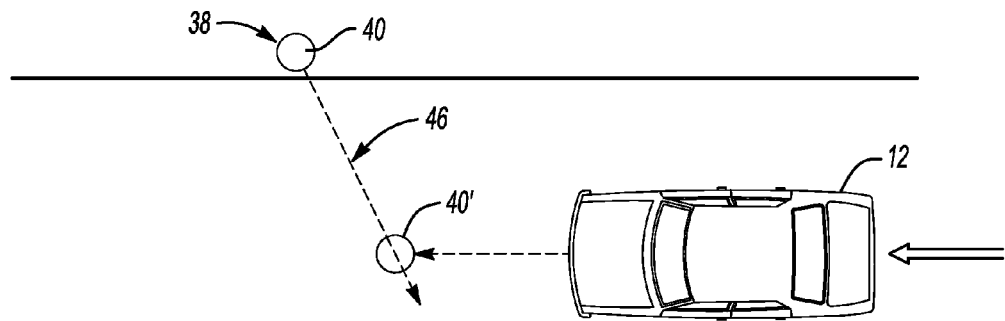
FIG. 8A is a schematic representation of a vehicle and pedestrian on a potential collision path.

Referring to FIG. 8A, an example scenario is shown where a pedestrian 40 is detected in a predicted path 46 that crosses path of the vehicle 12. The sensors 18 provide information to the controller 12. The controller 12 uses this information to determine if the detected object is a pedestrian 40.

Figure 8B:
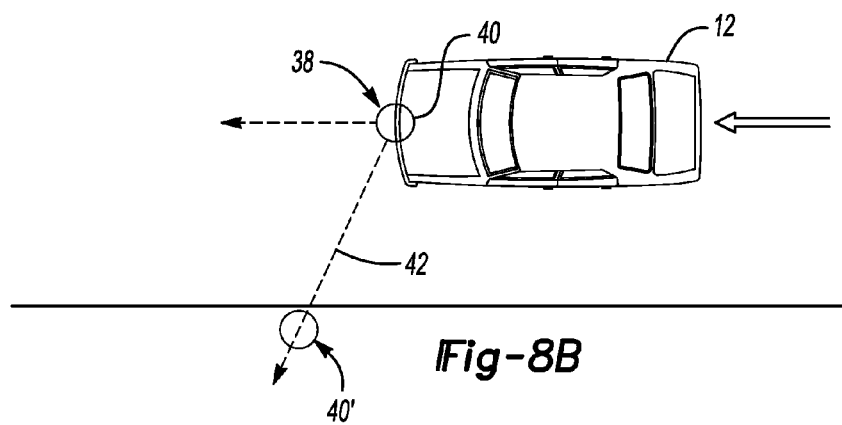
FIG. 8B is a schematic representation of the vehicle and the example system determining a predicted trajectory of pedestrian post collision.
Figure 8C:
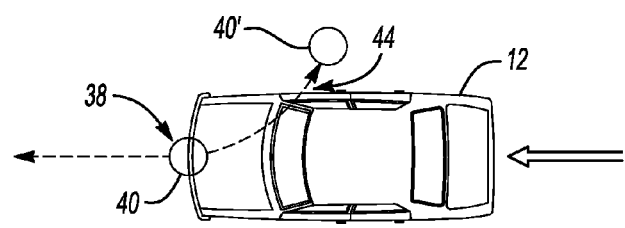
FIG. 8C is a schematic representation of an altered trajectory post collision for the pedestrian.

Referring to FIGS. 8B and 8C, the controller 12 utilizes the information received from the sensors 18 and derived from the characteristics of the detected object which has been confirmed to be a pedestrian 40 and determines a predicted trajectory 42 and predicted post collision location of the pedestrian indicated as 40'. The vehicle will then determine if there is an alternate trajectory 44 can be achieved by placing the vehicle 10 in a specific orientation that would mitigate or reduce the damage to the pedestrian 40 post collision. The controller 12 will determine this alternate trajectory 44 and orientate the vehicle 10 to induce the alternate trajectory 44 post collision. The alternate trajectory 44 is that trajectory that will mitigate or reduce injury to the pedestrian 40.

Accordingly, the example system 14 provides for the analysis of a potential collision and the tails the vehicle orientation to mitigate damages not only to occupants of the vehicle 10 but also to occupants or pedestrians involved in the collision. The example system combines pedestrian recognition and trajectory prediction with pre-crash vehicle preparation to mitigate damage and potential injury.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A method of orientating a vehicle for a potential impact, the method comprising:
    detecting an object proximate a vehicle with at least one sensor mounted to the vehicle;
    identifying if the object is a pedestrian;
    determining a potential for a collision between the object and the vehicle with a controller mounted within the vehicle;
    determining a vehicle orientation for mitigating damage based on the determined potential for collision, wherein the determined vehicle orientation includes at least an independent determination of a ride height for each corner of the vehicle; and
    actuating a suspension component to move each corner of the vehicle to the determined ride height for that corner independent of the other corners of the vehicle.

2. The method as recited in claim 1, including determining a post impact trajectory of the object responsive to identification of the object as a pedestrian.

3. The method as recited in claim 2, including determining a direction and speed of the pedestrian relative to the vehicle and the post impact trajectory based on the relative direction and speed between the pedestrian and the vehicle.

4. The method as recited in claim 2, wherein determining the vehicle orientation includes determining a vehicle orientation that changes the post impact trajectory of the pedestrian to minimize injury.

5. The method as recited in claim 2, including determining the vehicle orientation that minimizes harm to a pedestrian upon impact.

6. The method as recited in claim 1, wherein actuating the suspension component of a vehicle to raise at least one corner of the vehicle and lower another corner of the vehicle.

7. The method as recited in claim 1, wherein actuating the suspension component includes purging air from an air spring to lower a corner of the vehicle.

8. The method as recited in claim 1, wherein actuating the suspension component includes inflating an air spring to raise a corner of the vehicle.

9. A vehicle crash preparation system comprising:
    a controller including:
        a first portion configured to receive information indicative of an object proximate that vehicle;
        a second portion configured to identify if the objects proximate the vehicle comprises a pedestrian;
        a third portion configured to determine a vehicle orientation that minimizes damage responsive to a determination that a collision with the object is likely, wherein the determined vehicle orientation includes an independent determination of a ride height for each corner of the vehicle; and
        a fourth portion configured to initiate actuation of at least one suspension component of the vehicle to place the vehicle in the determined vehicle orientation, wherein the controller is configured for actuating a suspension component to move each corner of the vehicle to the determined vehicle orientation for each corner of the vehicle separate of other corners of the vehicle.

10. The vehicle crash preparation system as recited in claim 9, including at least on sensor mounted on the vehicle for detecting objects proximate the vehicle.

11. The vehicle crash preparation system as recited in claim 9, wherein the controller is configured to determine a post impact trajectory of the object responsive to identification of the object as a pedestrian.

12. The vehicle crash preparation system as recited in claim 11, wherein the controller is configured to determine a direction and speed of the pedestrian relative to the vehicle and the post impact trajectory based on the relative direction and speed between the pedestrian and the vehicle.

13. The vehicle crash preparation system as recited in claim 12, wherein the controller is configured to determine a vehicle orientation that changes the post impact trajectory of the pedestrian to minimize injury.

14. The vehicle crash preparation system as recited in claim 12, wherein the controller is configured to determine a vehicle orientation that minimizes harm to a pedestrian upon impact.

15. The vehicle crash preparation system as recited in claim 9, wherein the suspension component comprises an adjustable suspension component disposed proximate each wheel of the vehicle, each suspension component at each wheel adjustable independent of other suspension components at the other wheels.

16. The vehicle crash preparation system as recited in claim 9, wherein the controller is configured to actuate the suspension component of a vehicle to raise at least one corner of the vehicle and lower another corner of the vehicle.

17. The vehicle crash preparation system as recited in claim 9, wherein the controller is configured to actuate the suspension component by purging air from an air spring to lower a corner of the vehicle.

18. The vehicle crash preparation system as recited in claim 9, wherein the controller is configured for actuating the suspension component for inflating an air spring to raise a corner of the vehicle.

* * * * *